(12) United States Patent
McDowall et al.

(10) Patent No.: US 7,949,707 B2
(45) Date of Patent: May 24, 2011

(54) INTERNET RADIO RECEIVER WITH LINEAR TUNING INTERFACE

(75) Inventors: Ian E. McDowall, Mountain View, CA (US); Mark T. Bolas, Mountain View, CA (US); Scott Smith, Sonoma, CA (US); Mary McCann, Tempe, AZ (US)

(73) Assignee: Mosi Media, LLC, Wilmington, DE (US)

( * ) Notice: Subject to any disclaimer, the term of this patent is extended or adjusted under 35 U.S.C. 154(b) by 1047 days.

(21) Appl. No.: 11/180,287

(22) Filed: Jul. 12, 2005

(65) Prior Publication Data
US 2006/0067304 A1    Mar. 30, 2006

Related U.S. Application Data

(63) Continuation of application No. 09/859,811, filed on May 17, 2001, now Pat. No. 6,920,479, which is a continuation-in-part of application No. 09/570,834, filed on May 12, 2000, now abandoned, which is a continuation-in-part of application No. 09/334,846, filed on Jun. 16, 1999, now Pat. No. 6,389,463.

(51) Int. Cl.
G06F 15/16    (2006.01)

(52) U.S. Cl. ......... 709/203; 709/219; 709/225; 709/231

(58) Field of Classification Search ............ 709/203, 709/219, 225, 231
See application file for complete search history.

(56) References Cited

U.S. PATENT DOCUMENTS

| | | | |
|---|---|---|---|
| 4,572,652 A | 2/1986 | Tada et al. | |
| 5,029,290 A | 7/1991 | Parsons et al. | |
| 5,142,528 A | 8/1992 | Kobayashi | |
| 5,490,275 A | 2/1996 | Sandvos et al. | |
| 5,557,541 A | 9/1996 | Schulhof et al. | |
| 5,572,442 A | 11/1996 | Schulhof et al. | |
| 5,629,867 A | 5/1997 | Goldman | |
| 5,726,909 A | 3/1998 | Krikorian | |
| 5,757,417 A * | 5/1998 | Aras et al. ................. | 725/14 |
| 5,764,906 A | 6/1998 | Edelstein et al. | |
| 5,790,423 A | 8/1998 | Lau et al. | |
| 5,809,246 A | 9/1998 | Goldman | |
| 5,828,839 A | 10/1998 | Moncreiff | |
| 5,841,979 A | 11/1998 | Schulhof et al. | |
| 5,892,536 A | 4/1999 | Logan et al. | |
| 5,922,045 A | 7/1999 | Hanson | |
| 5,926,624 A | 7/1999 | Katz et al. | |
| 5,956,681 A | 9/1999 | Yamakita | |
| 6,005,603 A | 12/1999 | Flavin | |

(Continued)

FOREIGN PATENT DOCUMENTS

| | | |
|---|---|---|
| EP | 0 848 373 | 6/1998 |
| EP | 1 050 111 | 11/2000 |
| JP | 08-317353 | 11/1996 |
| WO | 99/27690 | 6/1999 |
| WO | 99/38266 | 7/1999 |
| WO | 0027135 | 5/2000 |
| WO | 0077655 | 5/2000 |

OTHER PUBLICATIONS

Internet printout "The Audible Player and How It Works"; Accessed Nov. 12, 1997.

(Continued)

Primary Examiner — Larry Donaghue
Assistant Examiner — Nicholas Taylor

(57) ABSTRACT

A system for supplying streaming media or other media sources to clients, said system providing for selection of internet based audio content providers based on arbitrarily assigned numbers that function as proxies for the URL or IP address of the audio content providers.

20 Claims, 7 Drawing Sheets

U.S. PATENT DOCUMENTS

| | | | |
|---|---|---|---|
| 6,012,086 | A | 1/2000 | Lowell |
| 6,014,569 | A | 1/2000 | Bottum |
| 6,130,936 | A | 10/2000 | Hartmann |
| 6,154,665 | A | 11/2000 | Briffett et al. |
| 6,192,490 | B1 | 2/2001 | Gross |
| 6,249,810 | B1 | 6/2001 | Kiraly |
| 6,289,207 | B1 | 9/2001 | Hudecek et al. |
| 6,389,463 | B2 | 5/2002 | Bolas et al. |
| 6,430,236 | B1 | 8/2002 | Funakoshi |
| 6,442,598 | B1 * | 8/2002 | Wright et al. ............ 709/217 |
| 6,587,127 | B1 * | 7/2003 | Leeke et al. ............. 715/765 |
| 6,636,888 | B1 * | 10/2003 | Bookspan et al. ......... 709/203 |
| 6,741,869 | B1 * | 5/2004 | Lehr ..................... 455/557 |
| 6,823,225 | B1 | 11/2004 | Sass |
| 7,206,748 | B1 * | 4/2007 | Gruse et al. ............... 705/1 |
| 7,694,319 | B1 * | 4/2010 | Hassell et al. ............ 725/34 |

OTHER PUBLICATIONS

"Product Brochure for Audioactve Tuner"; Telos Systems.
DC Radio Website for CD Radio; CD Radios Inc.; 1998.
Sawhney, et al., "Nomadic Radio: Scaleable and contextual Notification for Wearable Audio Messaging," May 1999, ACM Digital Library: Conference on Human Factors in Computing Systems, pp. 96-103.
International Search Report; International Application No. PCT/US00/16399; Dated Aug. 25, 2000.
"Telos Systems Releases the Audioactive Tuner, World's First Standalone Internet Audio Tuner/Player"; http://www.zephyr.com/press/pr040498b.html; Apr. 4, 1998.
Interactive Media: An Internet Reality, IEEE Specturm, vol. 33, No. 4, Apr. 1, 1996, IEEE Inc., New York, US, 4 pages.
San Francisco Chronicle "Radio On-line Not Set For Prime Time" Feb. 23, 2001, 2 pages.
Supplementary European Search Report issued Feb. 26, 2009 for EP 00942821.0, 4 pages.
Office Action in Japanese Application No. 2002-529980 dated Sep. 10, 2002.
Official Action in Japanese Application No. 2001-503069 dated Feb. 2, 2010, 6 pages; English Translation Available.
Itaru Ishihara, "Internet acceleration utility Speed capable prefetching the desired pages," DOS/V Magazine, SOFTBANK CORP., Jan. 15, 1998, vol. 7, No. 2, p. 249; Partial English Translation Available.
Response to Official Action in Japanese Application No. 10-2001-7016173 issued Nov. 6, 2006, filed Jan. 10, 2007, 18 pages.
Additional claim set in Japanese Application No. 10-2001-7016173 issued Nov. 6, 2006, filed Jan. 10, 2007, 4 pages.
Response to Official Action in Japanese Application No. 2001-503069 issued Jul. 14, 2009, filed Jan. 14, 2010, 10 pages.
Amended claims in Japanese Application No. 2001-503069 issued Jul. 14, 2009, filed Jan. 14, 2010, 6 pages.
Response to Official Action in Japanese Application No. 2001-503069 issued Feb. 2, 2010, filed Aug. 2, 2010, 10 pages.
Amended claims in Japanese Application No. 2001-503069 issued Feb. 2, 2010, filed Aug. 2, 2010, 2 pages.
Official Action in Japanese Application No. 2001-503069 issued Jul. 14, 2009, 5 pages. English Translation Available, 5 pages.
Official Action in European Application No. 00942821.0 issued Jun. 17, 2009, 6 pages.
Response to Official Action in European Application No. 00942821.0 issued Jun. 17, 2009, filed Sep. 22, 2009, 12 pages.
Official Action in European Application No. 00942821.0 issued Sep. 3, 2010, 6 pages.
Official Action in Korean Application No. 10-2001-7016173 issued Nov. 9, 2006, 1 page. English Translation Available, 1 page.
International Preliminary Report in Application No. PCT/US2000/016399 dated Mar. 9, 2001, 3 pages.
Concise Explanation of Non-English Language Documents Under 37 C.F.R. § 1.98(a)(3) for NPL References 1-6.

* cited by examiner

INTERNET RADIO RECEIVER WITH LINEAR TUNING INTERFACE

This Application is a continuation of U.S. patent application Ser. No. 09/859,811, filed May 17, 2001, now U.S. Pat. No. 6,920,479, which is a continuation-in-part of U.S. application Ser. No. 09/570,834, filed May 12, 2000, now abandoned, which is a continuation-in-part of U.S. application Ser. No. 09/334,846, filed Jun. 16, 1999, now U.S. Pat. No. 6,389,463.

FIELD OF THE INVENTIONS

The inventions below relate to the field of internet communications.

BACKGROUND OF THE INVENTION

Recently, radiobroadcasters have begun transmitting their audio content over the internet, allowing consumers to listen to radio stations received over the internet and played through computer speakers. For a home user to receive radio station "netcasts" over the internet, the user must have a personal computer, an internet account, browser software such as Internet Explorer® or Netscape Navigator®, an audio processing software "plug-in" capable of processing audio information, and a radio simile graphical interface. The browser software must be purchased and/or downloaded from any one of various browser software companies, such as America Online, Microsoft, or Netscape. The audio processing software must be purchased and downloaded from other companies (Apple Computer's QuickTime® software, RealPlayer's RealAudio®, and Microsoft's Windows Media Player software are examples). Radio simile graphical interface software must be purchased and downloaded from yet another company (Digiband Radio and MacTuner are examples of radio simile interface software). None of the browsers are compatible with all the audio processing software, and none of the audio processing software is compatible with all the radio simile graphical interface software. A typical end user must be extremely lucky to install all the necessary components with proper cross compatibility. The end result, if it can be achieved, is the ability to access a web site sponsored by one of the software suppliers, review a database of radio station web sites maintained by the software suppliers, and link to the radio station web site from the database.

SUMMARY

The inventions described below provide devices and methods for receiving radio broadcasts over the internet in a device which resembles a typical radio receiver. The hardware is housed in a radio box separate from a personal computer, and the interface is a panel of physical radio knobs, buttons, FM and AM channel indicators, etc., on the radio housing. Inside the radio box, necessary computer components and software permit connection to the internet and communication with various sources of audio information. In one embodiment, the device is a completely stand-alone device which a consumer can plug into a telephone line, DSL line, ISDN line, local area network, or cable line and select radio stations with the same type of controls as a typical radio. In this embodiment, the device (which may be referred to as an internet radio or internet appliance) may be capable of receiving internet radio data over the internet as well as receiving traditional radio broadcasts over the air. Also described below are systems and methods for selecting internet radio broadcasts in the device. In another embodiment, the device is a box which communicates with the internet through the user's personal computer, which must then have an internet connection and internet software installed and operating. In another embodiment, the device is provided as a circuit board which can be installed in a regular radio or receiver, and enable the radio to access the internet through an internet connection.

Aspects of the interface are modeled on broadcast radio receivers. For example, the internet radio presents linear tuning selection, making it natural to "tune" to the "next" or "previous" stations by imposing a linear architecture on web radio stations identifiers. Since most radio listeners select radio stations based on frequency indications on their broadcast radio receivers, a frequency band can be used as station identifiers to impose the linear architecture. However, several broadcasters throughout the world may use the same frequency in different geographical locations (the assignment to frequency bands is regulated to ensure that stations using the same frequency are so far apart that interference is unlikely). Radio stations are generally tied to geographic locations, and they generally broadcast content that is relevant the geographic area. Accordingly, the internet radio may be provided with a selector system for selecting a geographic area for tuning, after which the user can tune to stations based on frequency.

The internet radio alternatively presents a numeric tuning scheme for organizing and selecting audio content netcasters. Each internet radio station is identified by an arbitrary station number or frequency proxy analogous to how listeners identify AM/FM radio stations by the stations' frequency number. Information on a particular internet radio station, including its arbitrary station number, is stored in a system management server and/or in the internet radio. When the user wishes to select a particular internet radio station, the user selects the station number designating the particular internet radio station by manipulating the band selector and the "frequency" selector. Upon selection of a particular internet radio station number, the internet radio begins negotiation protocol to communicate with the internet radio station. If the user selects a station number not allocated to an internet radio station, the internet radio can output an audio clip including a verbal statement indicating that the station number has not been assigned, or an audio clip of imposed static. If the user operates the device in a seek mode or scan mode, the internet radio may communicate with the system management server or an onboard database to determine adjacent assigned station numbers and serially connect to assigned station numbers. If the user selects a station number corresponding to an AM/FM radio station, the internet radio simply tunes to the radio frequency and outputs whatever radio program is being broadcast within the radio's reception range on that frequency, and operates as a conventional radio receiver.

The internet radio provides an easy way to tune to radio stations all over the world, as naturally as a user would tune to local FM and AM stations. A listener in New York might want to hear a Tokyo based morning show over breakfast (in New York), so it is advantageous to provide a system for delaying broadcast reception several hours. This can be done in a specialized internet server which stores the data and sends it out again at a later time. Different users could request different streams of the same original source but which were delayed by different amounts.

DETAILED DESCRIPTION OF THE INVENTION

Figure 1:
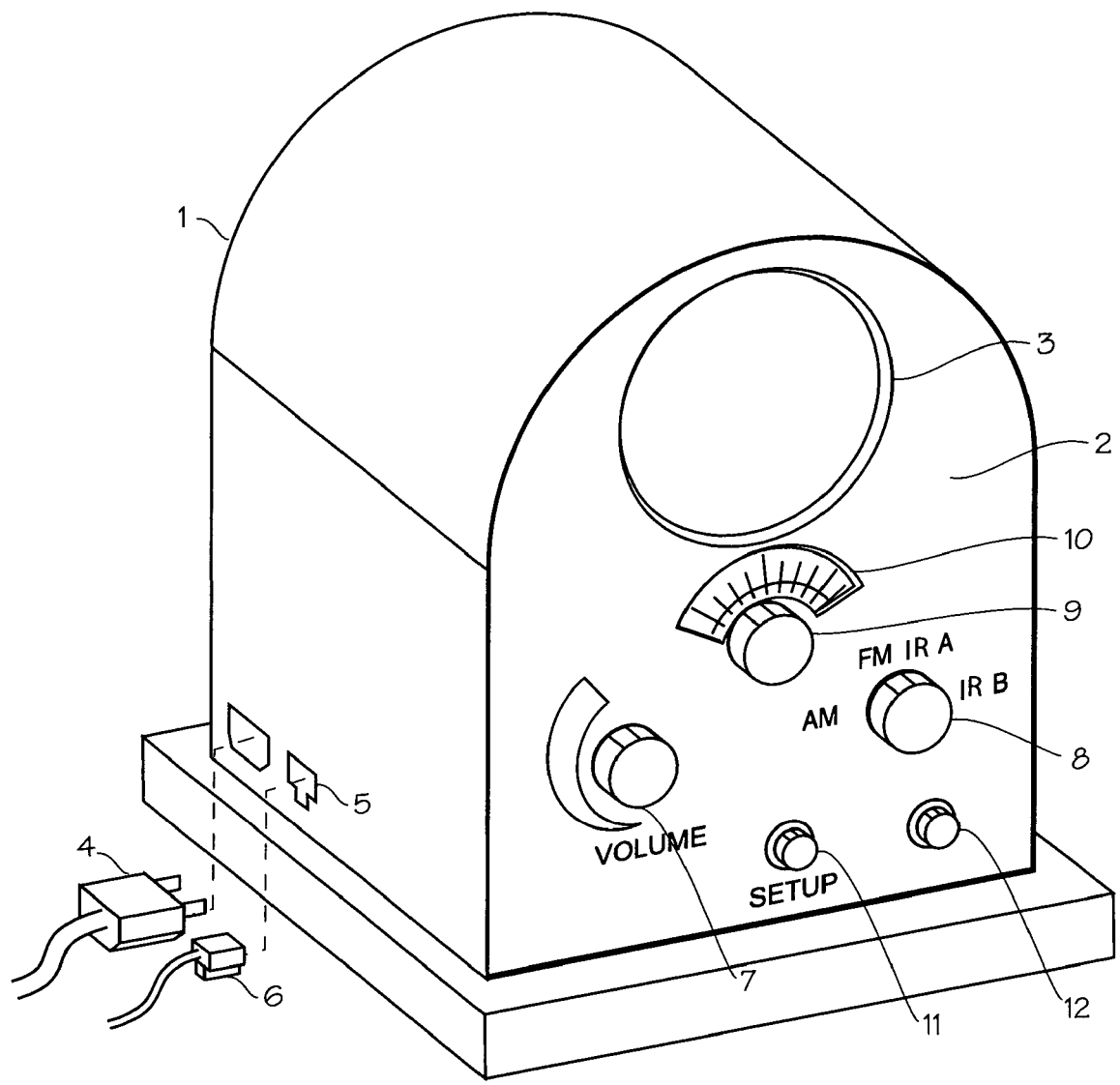
FIG. 1 shows a stand-alone embodiment internet radio.

FIG. 1 shows a stand-alone embodiment internet radio. The radio box 1 is provided as a shell for housing all the components used by the user. The box includes a control panel 2, a speaker 3, a power cord 4 (though the device may be battery powered, if desired) and a telephone jack or ethernet jack 5 and associated internet connection line 6 (which may be a telephone cord, Ethernet cable or other line). On the control panel, a volume selector 7 which can be manipulated to increase and decrease volume (the volume selector is provided in the form of a rotating knob, but may be provided in various other forms). Band selector 8 is provided to allow a user to select amongst AM radio, FM radio stations and other radio frequency bands or "virtual bands" (IR A and IR B) that the system ascribes to internet only audio sources (the ascription of virtual bands to net-only audio sources may be done arbitrarily within the system, or may be done through consensus amongst net-only netcasters). The band selector may be provided in the form of a rotary knob, scroll pushbutton, multiple pushbuttons or other configurations. A "frequency selector" or tuning knob 9 is provided to allow a user to select netcasters by selecting a frequency designation, much as a user would use a tuning selector on a radio or receiver, or by selecting from net stations organized as a linear list. The tuning knob can be provided in the form of a rotary knob, scroll pushbutton, a scan pushbutton, multiple pushbuttons or other configurations. The radio box also includes at least one display 10 for indicating current user selections. If an old fashion radio display is desired, the displays may be incorporated into the selector knobs/control panel structure, for example a pointer on the band selector combined with written labels on the underlying panels, as shown. If a modern electronic interface is desired (which will also easier accommodate use of net-only bands and emergent bands created after construction of the radio box), the display is preferably a digital display (shown in FIG. 2) which can display a readout of the frequency band, frequency or frequency proxy, geographic area selected by the user, and perhaps also display the volume, balance and tone as adjusted by the user. A setup control button 11 may be provided to permit the user to direct the internet radio to run through a set-up procedure to determine needed internet connection information such as local access telephone number, user name and password, and local ISP protocols. Alternatively, the setup may initiate an automatic configuration using a DHCP protocol or the like. Finally, an on/off switch 12 is provided to turn the device on and off.

Alternative configurations can be devised to match any user's listening preferences and pre-existing home audio/home theater systems. Speaker cable connections may be provided so that the device can be connected to higher quality audio speakers of the user's choice (the speaker can be disposed of if the end-product is to be provided as a receiver, in which case the box can be provided with speaker connections or audio output jacks for further connection to an audio amplifier or home theater amplifier/receiver). The internet connection line may be provided in the form of a telephone jack and cord, a network interface card and network cables, cable television cable, an ISDN line, a cellular phone jack or complete cellular phone, or any other means for connecting to the internet. Additional audio controls, such a treble and bass adjustment, balance adjustments, bass boost, etc. may also be added to the control panel.

Figure 2:
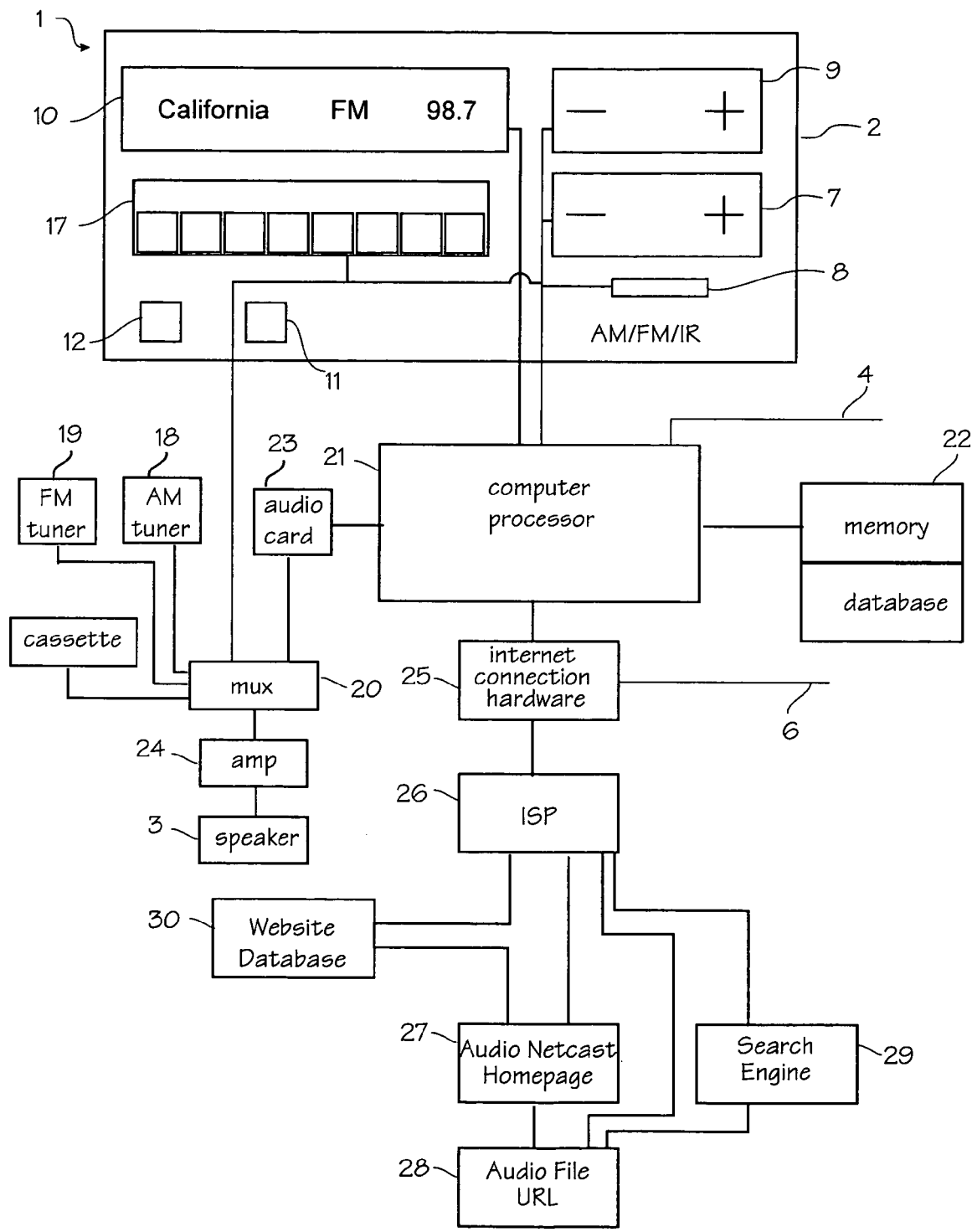
FIG. 2 is a block diagram of the stand-alone embodiment of the internet radio.

FIG. 2 is a block diagram of the stand-alone embodiment of the internet radio. The radio box 1 includes the control panel 2 with controls mentioned above, such as volume control 7, band selector 8, tuning selector 9, and display 10. The radio box also includes the speaker 3 (which instead might be replaced by speaker jacks or a line level output to a separate high fidelity amplifier). The radio box is connected to household current through power cord 4, and connected to household telephone wiring through telephone cord 6. An alphanumeric input device 17 comprises a touchpad, pushbutton array or the like to input basic user-related system information during the configuration process (a telephone pad input system, common to cellular telephones, may be used). This input device can also serve as a set of pushbutton preset switches which may be used to select preset audio source selections during normal use. The internet radio can include means for receiving and processing AM/FM broadcasts. This can include a conventional antenna and conventional AM tuner 18 and FM tuner 19. The internet radio includes an input switch or multiplexer ("mux") 20 capable of receiving inputs from multiple sources like the AM tuner and FM tuners 18 and 19 and the audio card 23, or other inputs such as a cassette deck. The multiplexer is capable of selectively outputting the inputs received from the AM tuner, FM tuner and the audio card to the audio amplifier 24 in response to operation of the band selector. Using the band selector 8, the user can set the position of the multiplexer to output either the AM broadcast, FM broadcast, or the netcast. The electronics for connecting to the internet and communicating through the internet with audio sources includes a computer processor 21, computer memory 22, an audio card 23, an audio amplifier circuit 24 and an internet connection hardware 25 (the internet connection hardware may be a modem or modem card, a network interface card, cable modem, ISDN modem, DSL modem or the like). The computer processor is programmed with a minimal operating system and software or firmware required to operate the modem, manage network protocols to communicate with the ISP, web sites, streaming audio sources, etc., (and handle all negotiation with internet side modules), receive and respond to user inputs from the control panel, and process received data to send to the display 10 and audio card 23. The computer memory 22 is used by the computer processor to store information, such as user presets, a database of web site addresses (and operating software and internet software if this is not provided in firmware with the computer processor), frequency proxies and local digital sound recordings. The memory may be provided in the form of hard disks, floppy disks, minidisks, flash memory, memory sticks, RAM or any other form of memory. The audio card 23 receives data from the computer processor (or direct from memory) and translates it into audio signals which are then transmitted to the audio amplifier 24 and then to the speakers which then translate the audio signal and annunciate sound and provide the desired audible output. The internet connection is accomplished through the modem/NIC box, which is preferably provides data connection to a high speed internet connection such as DSL or a cable modem. (If internet access is through a dial-up modem, the modem card 25 processes data signals which are created in the computer processor for communication to internet web sites or processing centers through the telephone line, and processes data signals from the internet which are transmitted to the radio box through the telephone line.) The expected data transmitted from the computer processor to the internet websites/processing centers comprises requests for access to specific URL's, requests for specific audio sources from a database of audio sources maintained at a system website, searches for audio sources, and communication of some information regarding the specific user's internet radio to a web site. The desired data transmitted from the internet to the user's internet radio is the audio content from an audio source. This desired data will be accompanied by other data, such as an identification of the audio source or website, the audio data protocol or format, and other information used by the computer processor to process the audio information. The audio data is expected to be in a standard format (although several "standards" are currently in competitive use). The computer processor is programmed with one or more programs for translating the standard data formats for audio information into audio signals acceptable to the audio card.

On the internet side, as shown in FIG. 2, the internet components with which the internet radio interacts are illustrated. The radio must connect to the internet through a host, such as-an internet service provider (ISP) 26. The ISP serves to connect many internet users to the internet, and passes all the data between the internet radio and the various websites. Audio content netcaster website homepages 27 (of which there are currently thousands) transmit or stream audio information, upon request, to many internet users simultaneously. The audio files are provided through an audio file server 28 "behind" the homepage, with a separate URL. At the audio file servers, audio data is stored in a digital stream format for communication through the internet. The audio data is provided through streaming audio software that provides the audio data to users requesting a connection to the audio data stream. Various search engine websites 29 exist on the web, and may be accessed to search for audio content websites. A system management website 30 provides management services to the community of internet radio users, such as maintenance of a content provider database, audio file servers associated with content providers, management of advertising content interjection or pre-rolls, firmware/software updates, and initial configuration management.

In normal use, internet radio users will merely turn the radio on and select a radio band (AM, FM, or NetM), select a station by associated frequency, call sign, web address, or frequency proxy (or other arbitrary designation). When preset buttons are enabled and programmed, the user can select any preset "station" or audio source by pressing a preset button. The internet radio will dial the user's ISP, sign onto the users internet service, and negotiate with the ISP to link to the URL or web site address of the desired audio content netcaster or link to the URL or web site address of the associated audio file server.

For initial use, it is preferable that the stand-alone version of the internet radio require as little configuration as possible. Thus, the internet radio is programmed with software which, upon first use or in response to a request to configure (which can be entered in numerous manipulations of the input knobs), will:

(1) Dial-up server-based walk through: operate the modem to connect to a stored telephone number and to a system management server operated by the proprietors of the internet radio system, and upon connection the system management server will communicate with the individual internet radio (as if it were a "client node") to download a database of audio content provider URLs, query the user (through the display panel) as to their ISP identity, ISP local telephone number, username and password. If necessary, the system management server will download any software/firmware updates and audio processing plug-ins to the user's internet radio; or (2) Front panel configuration: operate the display and memory to query the user (through the display panel) as to their ISP identity, ISP local telephone number, username and password; and optionally initiate a call to the internet and communication with the system management server and negotiate a download of current database of audio content provider URLs; or (3) Nation-wide provider setup: operate the modem to connect to a telephone number of a nation-wide or area-wide ISP company (such as CompuServe or AOL), to obtain local telephone access numbers, and walk through setup with entry of ISP screen names and passwords through the keypad in response to prompts from the nation-wide or area-wide ISP company; or (4) Personal telephone call with a system customer representative, where the user communicates location, ISP information, screen name and password to the customer representative; the customer representative can then walk through configuration with the user, or enter configuration data into system management server, whereupon the internet radio can dial-up system management server directly and negotiate automatically with the system management server to configure the internet radio with the data provided to the customer service representative (the data can also be provided to the system management server by the user using their own personal computer and web browser).

Figure 3:
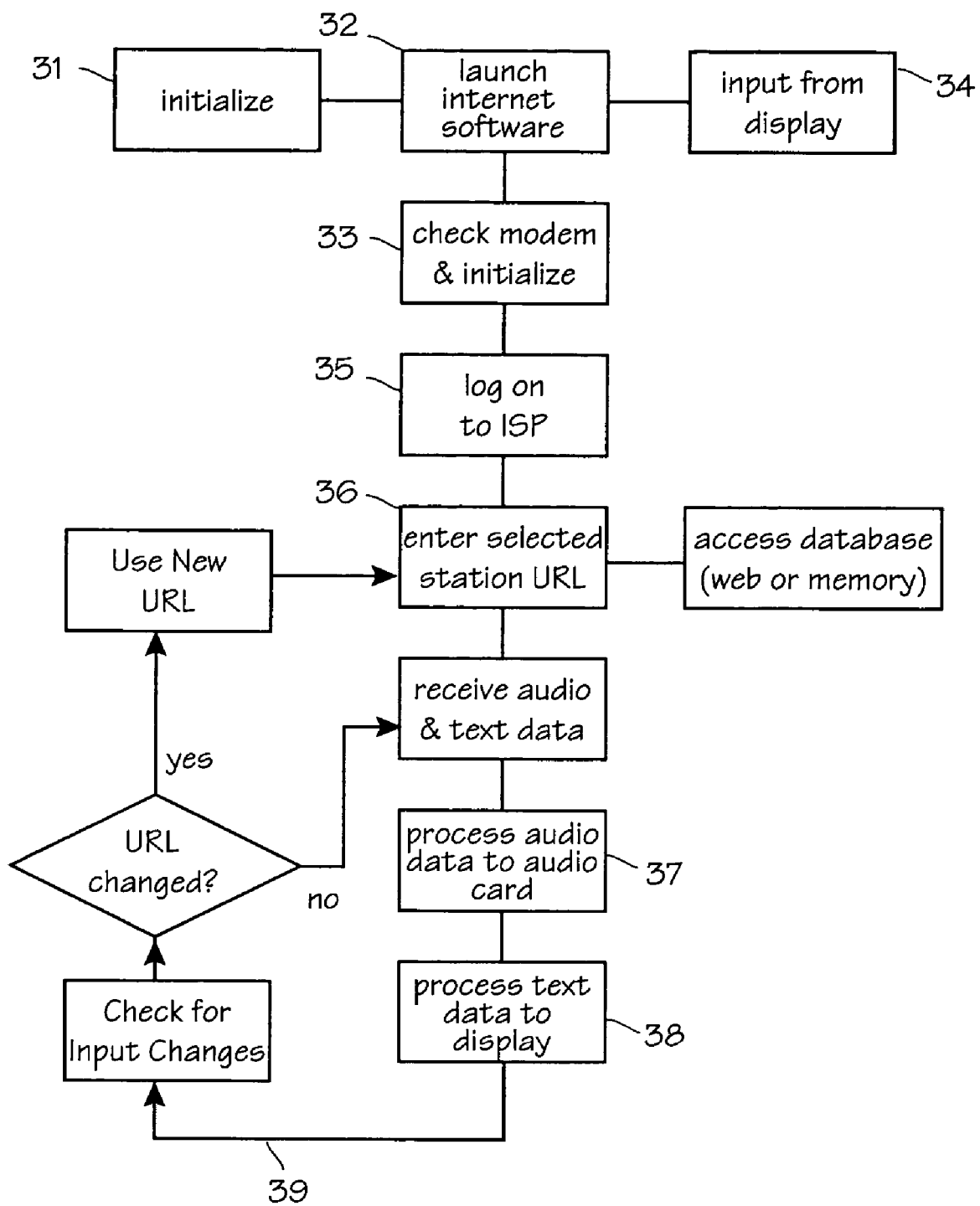
FIG. 3 is a flow chart of the software necessary to operate the internet radio system.

The software necessary to operate the internet radio system is illustrated in flow chart form in FIG. 3. Upon system startup (preferably accomplished by turning the radio on using the power button), the system software loads (block 31). Since the device has a single purpose, the application software can be immediately launched upon startup (block 32) and in fact can be combined with the system software. The system/application software initializes the internet connection hardware (if a modem is used, this may include checking for dial tone (or other expected signal from the internet connection) and proper response from the internet connection hardware (block 33), and checks for input from the user interface (block 34), such as the desired band and station. The software logs onto the user's ISP (block 35) (If a dial up connection is used, this may include negotiating with the user's ISP to enter screen name and password, and waiting for the opening screen or ISP homepage). If the system is designed to use an audio content provider database which is stored in the internet radio's own memory, the content retrieval module of the software (block 36) looks up the URL corresponding to the desired station (which may be stored in on board memory or on the system management server) and then enters the desired audio content URL (i.e., the web address) in the ISP homepage. If the system is designed to depend on the system management server, then the content retrieval module of the software (block 36) enters the system management server address, awaits connection with the system management server homepage and enters the desired station identifier into the system management server. The system management server then looks up the web address for the desired station, and negotiates with the audio content provider website to arrange transmission of audio data to the user's internet radio. Upon receipt of the audio data, the data processing module (block 37) processes the audio data received and causes that data to be transmitted to the audio card, for eventual transmission to the speakers. The data processing module also processes any accompanying identifying data (block 38), and causes that identifying text data to be sent to the display. The system thereafter merely passes audio information through to the radio speakers, until the user turns off the radio or changes the station. When the station is changed, the software steps through the process of finding the web address corresponding to the desired audio content provider and negotiating with internet websites to arrange transmission of audio signals from the audio content provider to the internet radio (loop 39).

Figure 4:
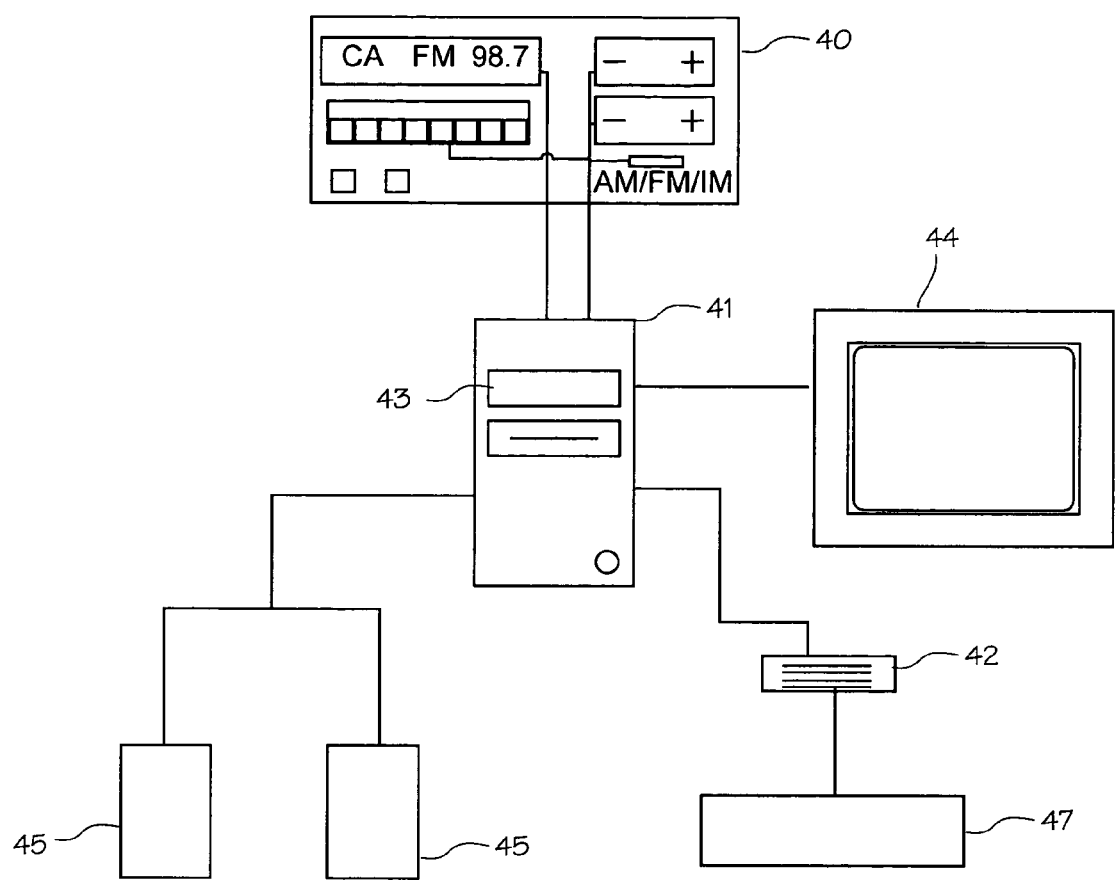
FIG. 4 shows a block diagram of an internet radio designed for use with a personal computer.

FIG. 4 shows a block diagram of an internet radio designed for use with a personal computer. The radio box 40 is supplied as a peripheral device for the personal computer system 41, to be connected with the USB, SCSI, serial or other communications protocol and appropriate connector 42. The radio box 40 in this embodiment contains circuitry and computer processor sufficient to create the radio-like interface. The remaining components are supplied in the personal computer system, which includes the processor 43, the monitor 44, speakers 45 and internet connection hardware 46 which connects the computer system to the internet 47. The computer in this embodiment, and the stand-alone player of FIG. 1, are referred to as clients, client computers or internet appliances. The software package for controlling the radio and responding to the user manipulation of the radio controls can be incorporated into a software program stored in the processor 42, as a driver or plug-in to popular browser software such as Netscape Navigator® or Internet Explorer®, and can incorporate various audio plug-ins for those browsers, such a RealAudio® or QuickTime® streaming audio software. The internet radio plug-in software provides the computer system with the capability of (1) receiving input from the radio box tuning selector 9, volume control 7, band selection control 8, (2) transmitting display text to the display (if provided, as in FIG. 2), (3) processing audio data for transmission to the speakers through operation of the streaming audio software. In operation, the user selects a desired streaming audio source by selecting it with the controls on the radio box, selecting the geographic origin of the desired audio source, the band of the desired audio source, and the frequency of the desired audio source (for radio stations) or other designation (for internet only audio sources).

The internet radio can be provided with a numerical tuning scheme for selecting an audio content netcasters. Each audio content netcaster is designated and identified by an arbitrary station number or frequency proxy very much like AM/FM radio stations are identified by the numerical portion of their alphanumeric call letters. The station numbers or frequency proxies can be whole numbers or include decimals. If the number range for designating audio content netcasters do not overlap with the number ranges for designating FM radio stations (87-108) and AM radio stations (530-1710), the input selector and display may provide for continuous selection of FM, internet radio and AM stations with a standard digital display and frequency selector typical used with radios. If the number range for designating audio content netcasters is arbitrarily chosen between 108 (the top of the FM radio number range) and 530 (the bottom of the AM radio number range), users can select stations, whether broadcast or webcast, from a continuous range of frequencies or frequency proxies which are presented without differentiation in the mode of selection. Other preferred station number ranges can be 1 to 86 or any number higher than 1711. (The frequency proxies may be chosen to overlap previously existing FM and AM number, if confusion may be avoided using the band selector.) In our example, CIBL in Canada, BBC in England, an audio book source, and a headline news source are designated and identified by arbitrary station numbers 123, 124, 125 and 126 respectively. The process of designating an audio content netcaster with an arbitrary station number can be implemented by the system management server 30 or the user. Some station numbers may not be in use or currently associated with an audio content netcaster. In our example, station number 128 is not in use. The arbitrary station numbers are stored in the system management server and/or the internet radio, and no two audio content netcasters are designated by the same station number. The station number range can be provided on the internet radio's display 10. The display provides the audio content netcaster number range of 109.0 to 529.9.

By frequency proxy, we mean a number which appears on the radio display as if it corresponded to a frequency of the underlying station which is played when the internet radio display is adjusted to display the number. In the FM and AM bands, the numbers displayed are the actual frequency of the station to which the radio is tuned. In the internet radio band, the numbers displayed have no relationship to a frequency, and serve as a proxy for a predetermined internet audio content provider. Frequency proxies are assigned to audio content providers arbitrarily. This means that there need be no correlation between any characteristic of the audio content provider and the assigned frequency proxy. The numbers may be assigned in any order, and may be randomly assigned as the audio content provider's URL is added to the system management database (in which case the frequency proxy would be the same for all users) or a database resident on individual internet radio appliances (in which case the frequency proxy assigned to each station would vary from user to user). The frequency proxy may be assigned based on any predetermined relationship or function of the IP addresses of the audio content providers, such as the numerical ordering of the IP addresses. For example, a number of IP addresses of the form 63.204.166.13, 204.204.166.160, etc. could be arranged in numerical order (either ascending or descending) and arbitrarily assigned to frequency proxies of the form 109.0, 109.1, etc. The typical twelve digit IP address may also be mapped to the available frequency proxies through a mathematical function. Also, sub-ranges of the available frequency proxies may be assigned to certain genres, so that users will become accustomed, and come to rely on, arbitrary ranges of frequency proxies to expect certain genres to be assigned to the sub-range. For example, talk radio stations may be preferentially assigned frequency proxies starting at 110.0 on the display, while pop rock stations may be preferentially assigned frequency proxies starting at 200.0, and other genres may be assigned in like fashion. Thus, there may be some underlying rational to the assignment of frequency proxies to audio content providers, though the scheme for making the assignment is arbitrary.

As programmed, the software takes input from the control panel knobs and/or pushbuttons or other input devices, and negotiates with the internet to receive a stream of audio data from the URL associated with the user's selection on the knobs or buttons. The net radio sends requests using the knob (and other) data translated into requests to a URL which is redirected by a server. For example, let's assume we have a user "iowajoe" who owns net radio with serial number 98678 who is turning the knob—here are examples of the kinds of requests which could be sent by the radio to the server (the server being designated by the web site names netradiostation.com in this example).

Turning the knob to various positions such as 123, 124, 125, and 126 (arbitrary station designations set by the system or by the user for CIBL in Canada, BBC in England, an audio book source, and a headline news source, respectively), would send the following requests:

http://www.netradiostation.com/stations/iband?knob=123&user=iowajoe&serialno=98678
http://www.netradiostation.com/stations/iband?knob=124&user=iowajoe&serialno=98678
http://www.netradiostation.com/stations/iband?knob=125&user=iowajoe&serialno=98678
http://www.netradiostation.com/stations/iband?knob=126&user=iowajoe&serialno=98678

On the netradiostation server side (this is pseudo code), the system will receive and act upon input from the user's internet radio box as follows:

```
If (user == iowajoe)
  ...
  If (knob == 123)
    Serve audio stream of an add for brand name blue jeans
    Connect to CIBL station in Canada at
      http://www.cibl.cam.org/live.ram
  If (knob == 124)
    Serve audio stream of locally stored headlines from BBC News
    Redirect to live feed from BBC News to join the program in progress
  If (knob == 125)
    Serve audio stream for today's chapter of audio book of the week
  If (knob == 126)
    Find user in user database and locate city
    Redirect to audio stream for user's local weather based on
      city information
    Serve audio stream for user's local advertisement of
      Bageltown on Main Street
    Redirect to audio stream for People Magazine headlines
    Redirect to audio stream for Sports Headlines
    Serve audio stream from text to voice converter of sports scores
  based on user interest
      in Hockey, and the local high school Wildcats team
    Redirect to ad for the Gap at http://www.gap.com/audio/add?
      local=iowacity&user=male
    Redirect to audio stream for 40's swing at
http://www.newcastle.edu.au/fm104.ram
```

Figure 5:
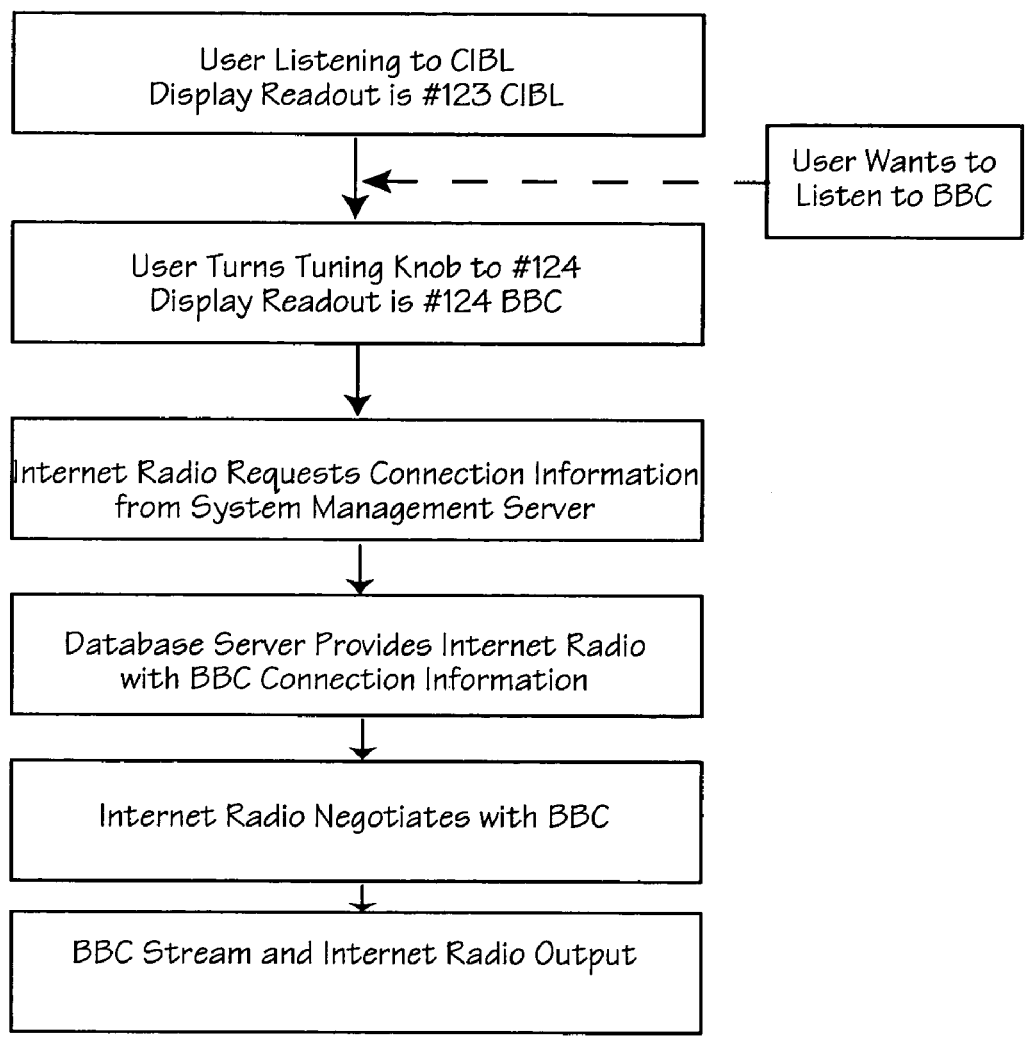
FIG. 5 is a flowchart of the tuning process wherein the user is switching from a first internet radio station to a second internet radio station.

FIG. 5 is a flowchart of the tuning process wherein the user is switching from a first audio content netcaster to a second audio content netcaster. The internet radio 1 is in communication with audio file server CIBL in Canada via the internet. Server CIBL is streaming audio data to the internet radio for outputting through the radio's speakers. On the internet radio's display 10 is the readout "123" or some other readout indicating that the current selected station number is 123. On the control panel, the band selector can be in the virtual band position. The user then wishes to switch to station BBC. The user manipulates the tuning knob, seek button or preset buttons until the display reads "124." When the knob is on number 124, the stored audio stream for the BBC headlines is served from the system management server (netradiostation) server while the system negotiates a connection with the BBC "live" audio stream feed. As the stored audio stream draws to a close, the connection to the live BBC feed is initiated.

Figure 6:
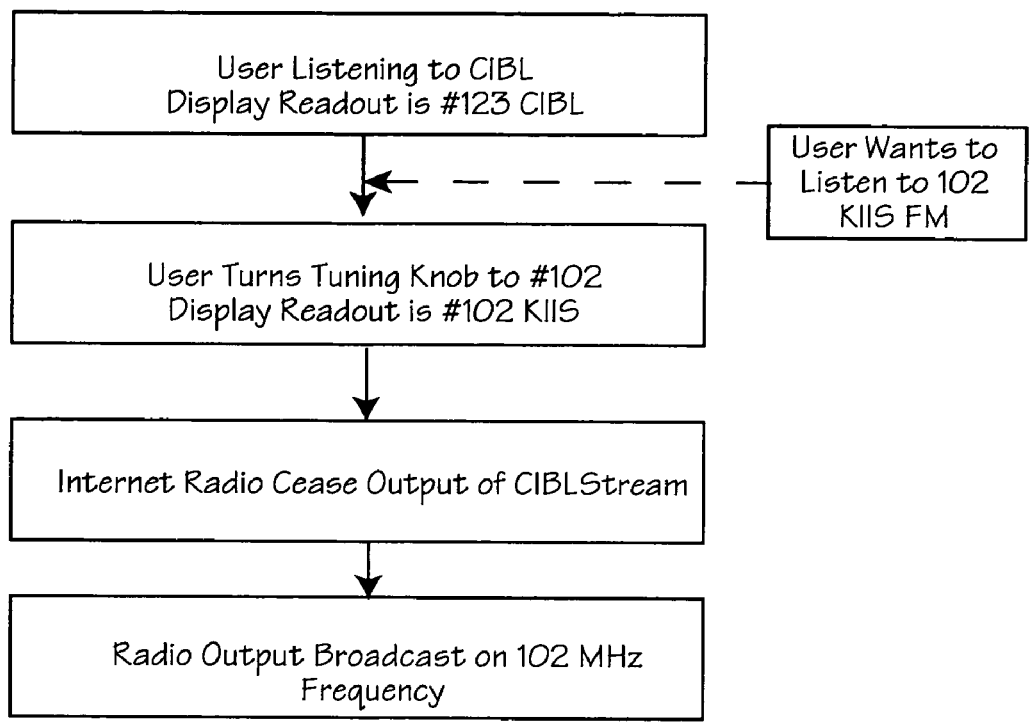
FIG. 6 is a flowchart of the tuning process wherein the user is switching from an internet radio station to an AM/FM radio station.

FIG. 6 is a flowchart of the tuning process wherein the user is switching from an audio content netcaster to an AM/FM radio station. The internet radio 1 is in communication with audio file server CIBL via the internet. Server CIBL is streaming audio data to the internet radio for outputting through the radio's speakers. On the internet radio's display 10 is the readout "123" or some other readout indicating that the current selected station number is 123. On the control panel, the band selector can be in the virtual band position. The user then wishes to switch to FM radio station 102 KIIS. The user manipulates the tuning knob, seek button or preset buttons until the display reads "102." The user also manipulates the band selector 8 to the FM position. Upon selection of station number 102, the internet radio simply tunes to the frequency 102 MHz and begins to output the radio broadcast. The internet radio ceases output of the audio stream from server CIBL at any point between the user selecting station number 102 and output of the FM radio broadcast.

Figure 7:
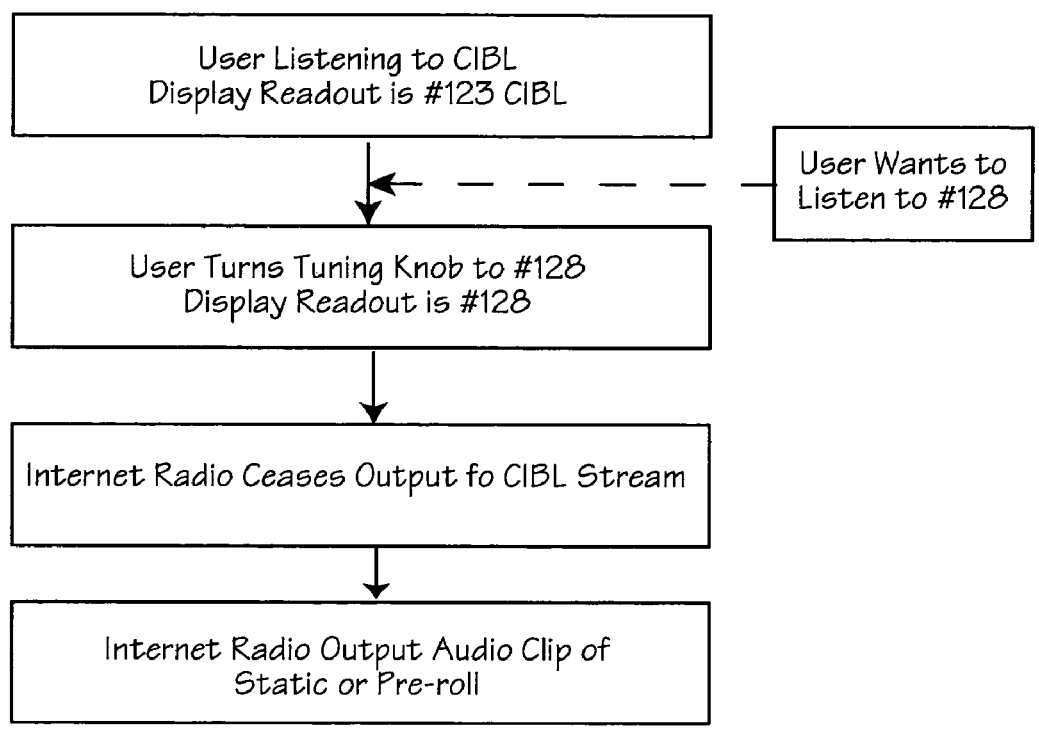
FIG. 7 is a flowchart of the tuning process wherein the user is switching from an internet radio station to no station.

FIG. 7 is a flowchart of the tuning process wherein the user is switching from an audio content netcaster to no station. The internet radio 1 is in communication with audio file server CIBL. Server CIBL is streaming audio data to the internet radio for outputting through the radio's speakers. On the internet radio's display 10 is the readout "123", or some other readout indicating that the current selected station number is 123. On the control panel, the band selector can be in the virtual band position. The user then wishes to switch to station number 128. Station number 128 does not designate any audio sources. The user manipulates the tuning knob, seek button or preset buttons until the display reads "128." The internet radio determines that station number 128 is not being used to designate any audio sources. Upon such determination, the internet radio can output a stored pre-roll, static noise or any other audio clip. The internet radio ceases outputting the audio stream from server CIBL at any point between the user selecting station number 127 and output of the audio clip.

The netradiostation server uses the tuning knob and user parameters to index into a list of station URLs from which the radio audio data will be actually served. During that redirection process, the netradiostation server may provide some content while the other site is being connected to and the stream initialized. Thus, when the user turns the control panel knobs to select station 123, the system negotiates a connection to the CIBL radio station's audio stream. While the system is negotiating, the system management server can feed an advertising audio stream to fill otherwise dead "air" time. In the system operation illustrated in relation to arbitrary channel designation or number 126, the user has stored a number of URL's for various audio sources, such as local weather, sports headlines, gossip headlines, etc. The system management server redirects the inquiry accordingly, on the basis of the knob and user data provided in the request.

The internet radio described employs a linear tuning band for station selection. This linear approach means that the order in which stations are visited when adjusting the tuning is fixed. This provides the software with the ability to pre-fetch audio from the "next" or "previous" URLs in the list. As a result, when the tuning is adjusted, the internet radio does not have to initiate a connection to the new station from scratch and may in fact already have a connection initiated and some (perhaps low quality) audio buffered in anticipation of an adjustment in tuning. This will reduce the apparent dead time when changing net radio stations.

When changing stations, the internet radio may fill the time to initiate the playing of the audio stream from either special a clip on a server which is a few hops away or from local storage in the device. These audio sources could contain advertising, station identification, or other audio to be played while the connection with the desired URL is initiated.

The tuning process we have described is based on a linear list of net radio stations. There is no reason to only create one NetM band—it may be advantageous to define a number of different bands which each have different characteristics such as local, international, jazz, etc.

In addition to a set of linear bands, the bands may be organized as a tree of bands. In this organization, there is a top level band which contains a number of other bands and so on. For example the top level band (which may be customized by the user) might look like this:

<KCBS Local News Station> <Jazz Stations> <International>... Selecting <KCBS Local News Station> plays the local news on KCBS. Selecting <Jazz Stations> presents a new band of Jazz Stations: such as <WBGO NJ> <WFSJ FL> <WJZW Smooth Jazz DC> <WPFW DC> . . . <Jazz in Europe> . . . . Selecting <Jazz in Europe> brings up a new band which includes stations of Jazz in Europe and perhaps other bands which present different orderings of the band itself. Thus, <Jazz in Europe> might have European jazz stations listed alphabetically by call letters but also have bands such as <Jazz in Germany> which contain just German European jazz stations.

On the control panel 2, a display is shown which indicates the current station being played. An alternative to this visual display would be for the internet radio to provide audio cues for station identification, and during the tuning process. For example, as one changes stations on the Jazz dial, the internet radio can play a brief clip with a station identifier as one roamed across the band.

The internet radio can be provided with a host of ancillary capabilities. It can be provided with digital signal processing capability to improve the perceived sound quality of the presentation. An audio input capability (either analog or from stored media) can be provided to allow the user to transmit audio data over the net, creating an audio netcast site. The internet radio can also be manufactured in modular form, with a circuit card being fashioned along with a complementary stereo receiver, boom box, car radio or the like. The circuit card housing the computer processor, modem, and input and output connectors can be supplied as a component to be install in such systems in original equipment manufacture, or as an after market upgrade for systems designed with necessary connectors and installation space to accommodate and after market upgrade. Although the term radio has been used by analogy, the device can more generally be considered as an audio content receiving device.

Imposed static is one ancillary capability that facilitates use of the system in the face of imperfect performance of audio content providers. Many attempts to access audio content servers will fail because the server is inoperative, the URL has changed, the user has selected an unused frequency proxy in a system which uses frequency proxies, or a host of other reasons. Upon failure to connect to the audio content provider, the user's system will receive no input, and thus have no audio output. Without further direction from the system, the user's audio output will remain silent. This deprives the user of the natural feedback indicating the status of the system.

To provide an indication whenever the user has tuned to a station that is inoperative, the system management server, as described above, looks up the web address for the desired station (selected by the user), and negotiates with the audio content provider website to arrange transmission of audio data to the user's internet radio, and then monitors the connection for successful connection. Should connection fail to be completed, or fail after it is established, the overall system can impose static on the audio output. To accomplish this, the system management server (or other component in the system) is programmed to detect a failed connection and direct or otherwise cause the play of audio static or crackle, verbal statements indicating failure of the connection, or any other distinct sound that informs the user that the chosen connection has failed. The verbal statements or distinct sound may include verbal statement or other indications of the cause of the failure and may also include prompts or suggestions or other indications of a corrective action to be taken by the user. The sound files for the distinct sound may be stored on the system management server, the user's computer or the radio box, or in the analogous components of a stand-alone player. The function of detecting a failed connection can also be assigned to the user's computer or the stand-alone player, rather than the system management server. Thus, the client computer can be programmed to monitor for successful connection between the client computer and the internet based audio content provider, and, upon sensing failure of said connection, causing the client computer to play on the audio speakers a distinct sound that informs the user that the chosen connection has failed.

The distinct sound can include messages to address various situations likely to be encountered. The system management server can be programmed to search for and propose, through verbal statements, an alternate audio content provider in the case of a failed connection with the user selected audio content provider, and then await input from the client computer which may indicate acceptance of the alternative or a fresh selection by the user of another audio content provider. Also, some audio content providers may required payment of a fee, through a subscription, before transmitting audio content to a client computer. The connection will be established between the client computer and the subscription based audio content provider, but no audio content will be transmitted unless the client computer transmits required codes or identification data to the audio content provider. In this case, the system may detect the refusal to transmit content, and direct the transmission and play of distinct sounds including verbal statements which announce the subscription requirement and provide prompts to user's establishing a subscription. To address another problem, the distinct sound can be used to block unwanted stations. For example, the user can communicate with the system management server, and enter names or URL's of audio content providers which it wants blocked from transmission. These would most likely include providers of adult content or otherwise offensive content, like polka music. When the client computer thereafter requests connection to blocked audio content providers, the system management server directs the play of static, verbal messages or distinct sounds, or redirects the request to other providers. The alternative providers can be preselected by the user or may be preprogrammed into the system management server.

When applied to streaming video, as described below, the imposed static can be provided in the form of audio static and crackle played through the audio speaker combined with an image of video snow displayed on the monitor. In addition to video snow and audio static, the verbal statements indicating failure of the correction, or any other distinct sound that informs the user that the chosen connection has failed may be provided, along with displayed dialog boxes, written messages, or distinct visual indications that inform the user that the chosen connection has failed. Indications of Subscription requirements and blocking of offensive content can be applied to the video content requests.

While the invention has thus far been described in terms of receiving audio content, and in particular the netcasts of current radio broadcasters, the invention may readily be used to receive video content should television or cable video content providers chose to netcast video content. In this case, the current world wide web interface which is now used to download relatively small video files may be replaced with a television-like interface, in which a monitor and speaker combination is provided with user input controls as described above, including (1) geographic origin selector, (2) band selector (i.e., broadcast or netcast only), and (3) channel selector, which are used by the viewer to select video content without resort to a personal computer and navigation through the architecture of the world wide web.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A device, comprising:
a housing;
a memory disposed within the housing, wherein the memory is configured to store information that associates at least one of a plurality of audio content sources with a corresponding URL of a provider from which the audio content source originates, wherein the plurality of audio content sources includes at least two audio content sources originating from providers that are located remote from the device and that are different from one another;
an input device disposed at an exterior surface of the housing, wherein the input device is controllable by a user to select one of the plurality audio content sources;
a processor disposed within the housing;
a network interface; and
an audio output;
wherein the device is configured to, in response to the user selecting a first audio content source:
  access the memory to obtain a URL of a first provider from which the first audio content source originates;
  send a request to the first provider via the network interface to access the first audio content source;
  receive, from the first provider via the network interface, data representative of audio information corresponding to the first audio content source;
  play the received audio information through the audio output; and
  prefetch, via the network interface, audio information corresponding to a second audio content source that originates from a second provider, wherein the second provider is remote from the device and is different from the first provider, and wherein prefetching the audio information corresponding to the second audio content source includes:
    sending, in response to the user selecting the first audio content source at a time when the second audio content source is not being accessed by the device, a request to the second provider to access the second audio content source;
    receiving, from the second provider via the network interface, data representative of audio information corresponding to the second audio content source; and
    storing the received audio information corresponding to the second audio content source.

2. The device as recited in claim 1, wherein the prefetching the audio information corresponding to the second audio content source includes storing the received audio information corresponding to the second audio content source as a format that produces reduced audio quality.

3. The device as recited in claim 1,
wherein the first provider is a first website and the second provider is a second website that is distinct from the first website; and
wherein at least one of the plurality of audio content sources is assigned a station number.

4. The device as recited in claim 3, wherein the device is configured to prefetch the audio information corresponding to the second audio content source from an audio content source that is assigned a station number that is numerically adjacent to a station number assigned to the first audio content source.

5. The device as recited in claim 4, wherein the device is further configured to play a predetermined audio clip in response to an inability to receive data corresponding to a selected audio content source.

6. The device as recited in claim 5, wherein the predetermined audio clip mimics a static sound.

7. The device as recited in claim 1, wherein the device is further configured to play a predetermined audio clip during a time period when a different audio content source is being requested in response to selection by the user.

8. The device as recited in claim 7, wherein the predetermined audio clip mimics a static sound.

9. The device as recited in claim 1, wherein the device is further configured to play a predetermined audio clip in response to an inability to receive data corresponding to a selected audio content source.

10. The device as recited in claim 9, wherein the predetermined audio clip mimics a static sound.

11. A method, comprising:
a device storing, for at least one of a plurality of audio content netcasters:
  an associated channel designation; and
  a URL of a provider from which the audio content netcaster originates;
  wherein the plurality of audio content netcasters includes at least two audio content netcasters originating from providers that are located remote from the device and that are different from one another;
the device receiving a selection of a desired channel designation of the associated channel designations, wherein the selection is made using an input device disposed at an exterior surface of a housing of the device;
the device determining a first audio content netcaster associated with the desired channel designation;
the device sending a request to a first provider from which a first audio content netcaster originates;
the device receiving, from the first provider, audio information corresponding to the first audio content netcaster;
the device outputting the audio information; and
responsive to said receiving the selection of the desired channel designation, the device prefetching audio information corresponding to a second audio content netcaster originating from a second provider that is remote from the device and is different from the first provider, wherein said prefetching audio information includes:
  sending, in response to said receiving the selection of the desired channel designation occurring at a time when the second audio content netcaster is not being accessed by the device, a request to the second provider to access the second audio content netcaster; and
  receiving, from the second provider via the network interface, data representative of audio information corresponding to the second audio content netcaster.

12. The method of claim 11, further comprising:
in response to the device failing to receive data corresponding to a selected audio content netcaster, the device outputting an audio clip.

13. The method of claim 11, wherein the first provider is a first website and the second provider is a second website that is distinct from the first website.

14. The method of claim 11, further comprising arranging the associated channel designations for selection by one or more genres.

15. The method of claim 11, further comprising the device storing the prefetched audio information as a format that produces reduced audio quality.

16. The device of claim 1, further comprising a display disposed at the exterior surface of the housing, wherein the display is configured to present information relating to one or more of the audio content sources, and wherein the display is separate from the input device.

17. The device of claim 16, wherein the input device and the display are portions of the exterior surface of the housing.

18. The device of claim 1, wherein the plurality of audio content sources are arranged for selection by one or more genres, and wherein the input device is selected from the group consisting of a rotary knob, a pushbutton, and a touchpad.

19. The device of claim 18, wherein at least one of the one or more genres is selected from the group consisting of jazz, talk radio, and pop rock.

20. An apparatus, comprising:
   a housing;
   first means, disposed within the housing, for storing information that associates at least one of a plurality of audio content sources with a corresponding URL of a provider from which the audio content source originates, wherein the plurality of audio content sources includes at least two audio content sources originating from providers that are located remote from the apparatus and that are different from one another;
   second means, disposed at an exterior surface of the housing, controllable by a user for selecting one of the plurality audio content sources; and
   third means for providing communication with a network;
   wherein the apparatus is configured to, in response to the user selecting a first audio content source:
     access the first means to obtain a URL of a first provider from which the first audio content source originates, wherein the selection is made using the second means;
     send a request to the first provider via the third means to access the first audio content source;
     receive, from the first provider via the network interface, data representative of audio information corresponding to the first audio content source;
     output the received audio information; and
     prefetch, via the third means, audio information corresponding to a second audio content source, wherein the second audio content source originates from a second provider that is remote from the apparatus and is different from the first provider, wherein prefetching the audio information includes:
       sending, in response to receiving the data representative of the audio information corresponding to the first audio content source at a time when the second audio content source is not being accessed by the apparatus, a request to the second provider to access the second audio content source; and
       receiving, from the second provider, data representative of audio information corresponding to the second audio content source.

* * * * *

UNITED STATES PATENT AND TRADEMARK OFFICE
CERTIFICATE OF CORRECTION

| | | |
|---|---|---|
| PATENT NO. | : 7,949,707 B2 | |
| APPLICATION NO. | : 11/180287 | |
| DATED | : May 24, 2011 | |
| INVENTOR(S) | : McDowall et al. | |

It is certified that error appears in the above-identified patent and that said Letters Patent is hereby corrected as shown below:

Page 2, item (56), under "Other Publications", in Column 1, Line 1, delete "Audioactve" and insert -- Audioactive --.

Page 2, item (56), under "Other Publications", in Column 1, Line 2, delete "DC Radio" and insert -- CD Radio Internet --.

Page 2, item (56), under "Other Publications", in Column 1, Line 12, delete "Specturm," and insert -- Spectrum, --.

Page 2, item (56), under "Other Publications", in Column 2, Line 5, delete "capable" and insert -- capable of --.

Page 2, item (56), under "Other Publications", in Column 2, Line 20, delete "Japense" and insert -- Japanese --.

Column 1, line 3 below "Title" insert -- CROSS-REFERENCE TO RELATED APPLICATIONS --.

Signed and Sealed this
Sixteenth Day of August, 2011

David J. Kappos
*Director of the United States Patent and Trademark Office*